J. R. BINNS.
AUTOMATIC MACHINE FOR BORING HANDLES.
APPLICATION FILED JUNE 10, 1912.
1,058,940.
Patented Apr. 15, 1913.
3 SHEETS—SHEET 3.
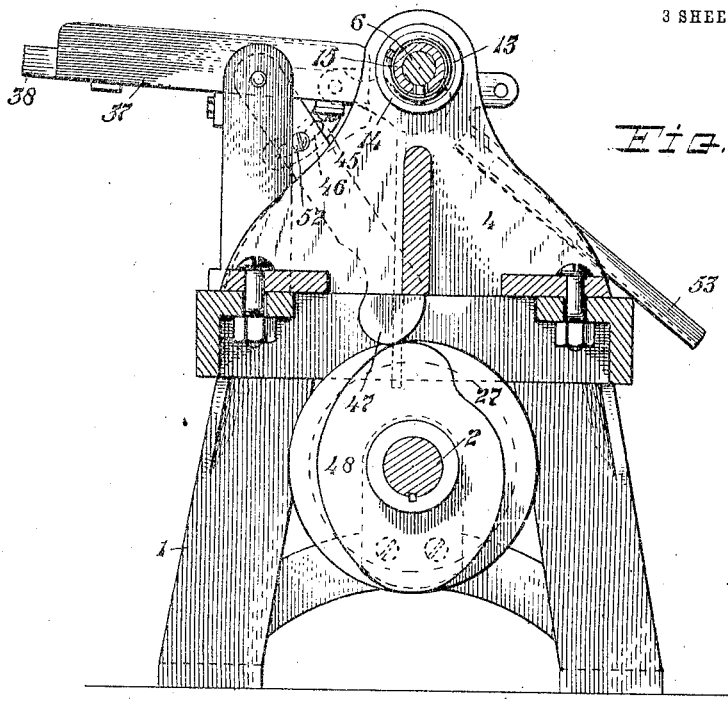
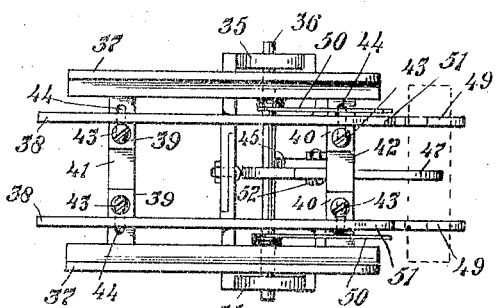
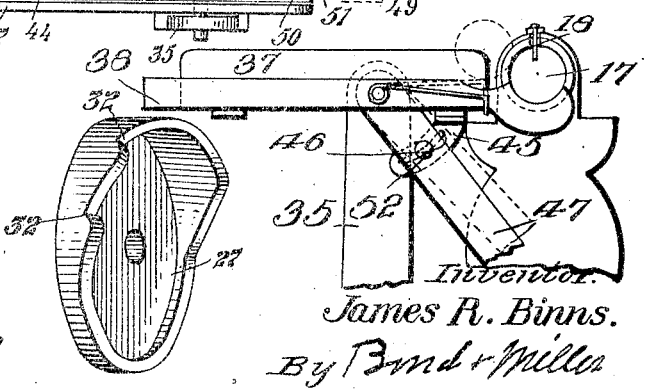
Witnesses:
Inventor.
James R. Binns.
By Bond & Miller
Attorneys.

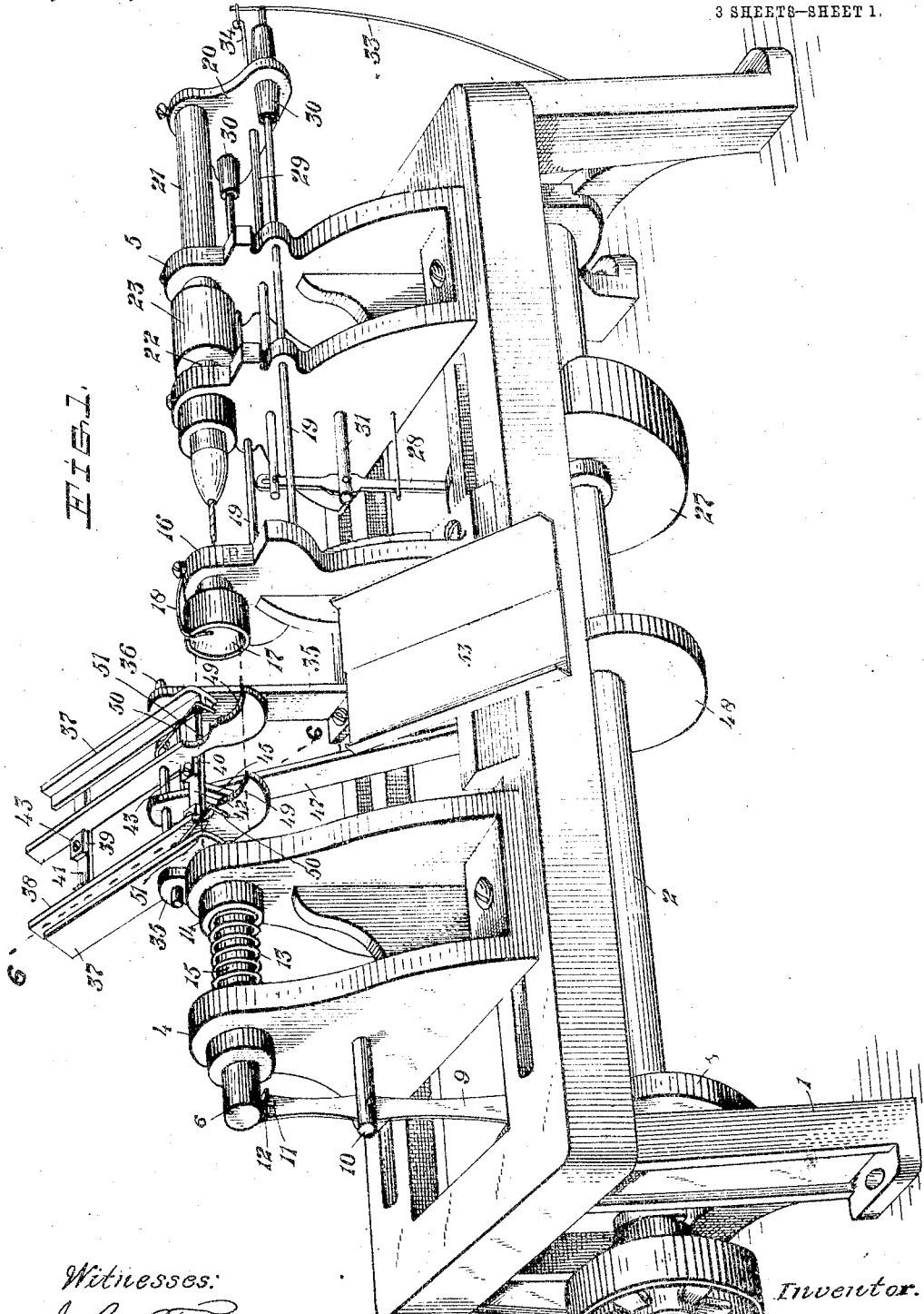

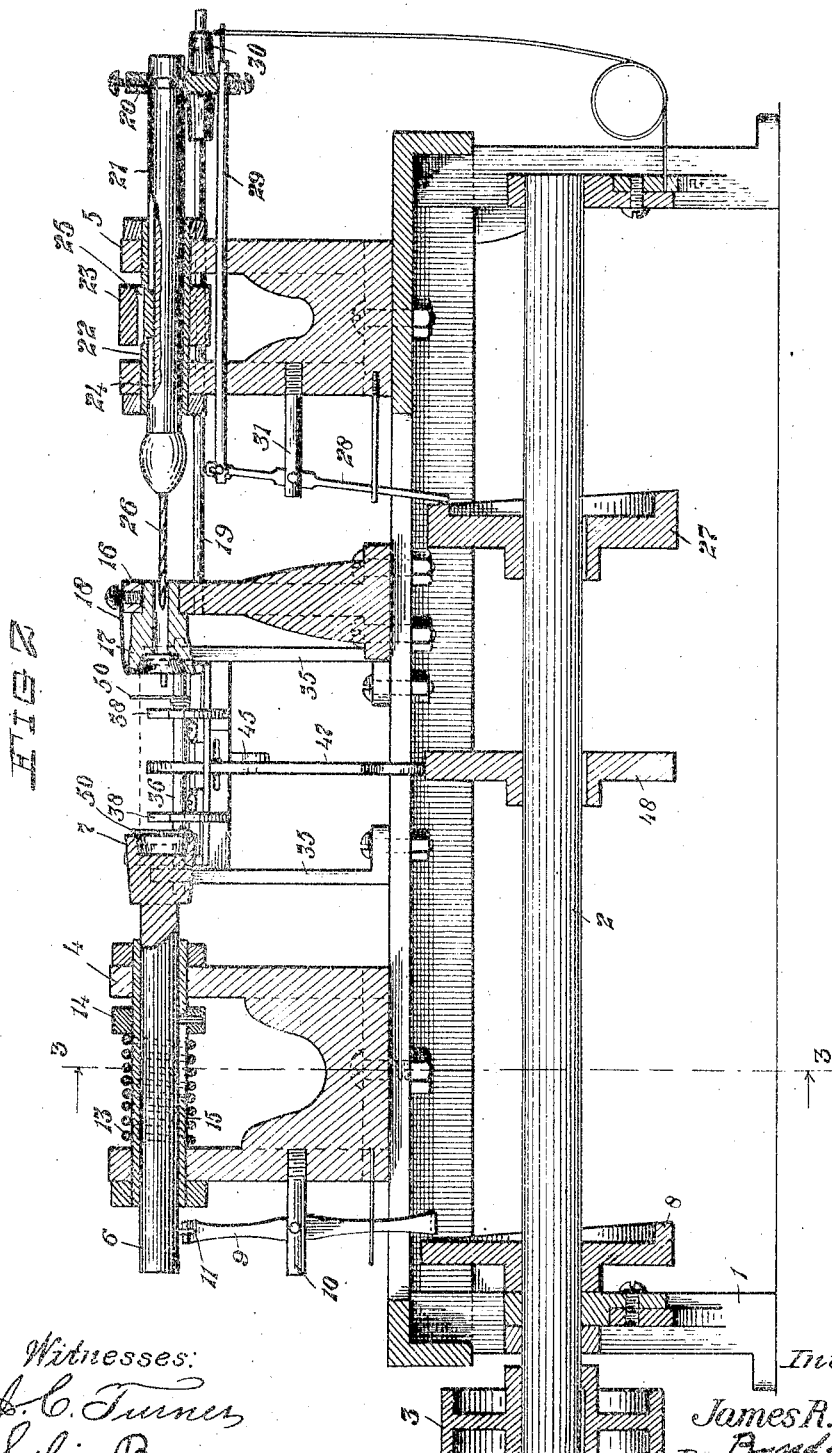

UNITED STATES PATENT OFFICE.

JAMES R. BINNS, OF CANTON, OHIO, ASSIGNOR OF ONE-HALF TO EDWIN D. MYERS, OF CANTON, OHIO.

AUTOMATIC MACHINE FOR BORING HANDLES.

1,058,940.  Specification of Letters Patent.  Patented Apr. 15, 1913.

Application filed June 10, 1912. Serial No. 702,644.

*To all whom it may concern:*

Be it known that I, JAMES R. BINNS, a citizen of the United States, residing at Canton, in the county of Stark and State of Ohio, have invented a new and useful Automatic Machine for Boring Handles, of which the following is a specification.

My invention relates to improvements in wood turning machines, in which means are provided for automatically feeding the material to be bored and means for actuating the drill and withdrawing the drill and releasing the article after it has been bored and the objects of my invention are, first, to provide devices for intermittently feeding a blank, second, to clamp the blank, third, to bore the blank and during the boring operation to partially withdraw the bit for clearance, and fourth, to release and deliver the blank or block. These objects together with other objects readily apparent to those skilled in the art I attain by the construction illustrated in the accompanying drawings, although my invention may be embodied in a variety of other mechanical forms, the construction illustrated being chosen by way of example.

In the accompanying drawings—Figure 1 is a perspective view. Fig. 2 is a vertical longitudinal section. Fig. 3 is a transverse section on line 3—3, Fig. 2. Fig. 4 is a plan view of the feeding mechanism. Fig. 5 is a detached perspective view of the drill actuating cam. Fig. 6 is a partial section on the line 6—6 of Fig. 1.

Similar numerals of reference indicate corresponding parts in all the figures of the drawings.

In the accompanying drawings, 1 represents the frame which may be of the form shown or it may be of any other desired form, reference being had to the proper arrangement of the various movable parts and fixed parts going to make up the machine proper. In the frame 1 is properly journaled the power shaft 2, which power shaft is provided with the ordinary belt or gear wheel 3. Upon the frame 1 are attached the frames or heads 4 and 5. The head 4 being for the purpose of carrying the slidable bar 6, which bar slides back and forth in proper timed relationship with reference to other parts designed to co-act with the blank holding socket 7 connected to or formed integral with the bar 6. For the purpose of releasing the blank after it has been bored as hereinafter described, the power shaft 2 is provided with a cam 8 fixed upon the shaft 2, and located in operative contact with the lever 9, pivoted intermediate its ends to the fixed bar 10, said fixed bar being securely connected to one of the members of the head 4 or its equivalent. To the sliding bar 6 is attached the pin 11, connecting the top or upper end of the lever 9 to the sliding bar 6, said lever being provided with a slot 12. It will be understood that as the cam 8 revolves its inclined face moves the lever 9 to withdraw or move the sliding bar 6 in the direction to release the blank or block.

For the purpose of automatically forcing the sliding bar 6, together with the socket 7 toward the end of a blank and clamping said blank, the spring 13 is provided, which spring is located between the inner face of one of the members of the head 4 and the collar 14. In use I prefer to place a hollow sleeve 15 upon the bar 6 and connect the collar to said sleeve and bar by means of the pin 15'. Between the heads 4 and 5 is located the standard 16, which standard is for the purpose of receiving the chuck 17, which chuck is for the purpose of receiving and holding one end of the blank or block designed to be bored.

For the purpose of automatically removing the blank or block from the chuck 17, when the socket 7 is withdrawn by means of the cam 8, the spring 18 is provided, which spring is so located that it will be in tension when the blank or block is gripped between the socket 6 and the chuck 17 so that when the blank or block is released the tension of the spring 18 will force the blank or block endwise sufficient to disengage it from the chuck 17. The head 5 is provided with two guide bars 19, which guide bars may be properly connected to the standard 16. Upon these guide bars is mounted the sliding head 20, in which sliding head is journaled one end of the drill shaft 21. Upon the drill shaft is mounted the sleeve 22 and upon said sleeve is mounted the pulley 23, said parts being so connected that the drill shaft 21 can slide in the sleeve but the pulley 23 is so connected that it will impart rotary motion to said sleeve and the sleeve in turn will impart rotary motion to the drill shaft 21, the key way 24 and the key way 25. It will be understood that a belt must be employed to impart rotary motion to the pulley 23 and the drill shaft 21. To the drill shaft 21 is attached in any convenient and well known manner the drill or bit 26, said drill or bit being of the usual construction such as commonly used in boring blanks or blocks.

After a blank or block has been automatically clamped in the socket 7 and the chuck 17 the bit 26 is moved toward the blank by means of the cam 27, the lever 28 and the pull bar 29 which is connected to the sliding head 20, and is also pivotally connected to the lever 28. The cam 27 is so formed and shaped that at the proper time the bottom or lower end of the lever 28 will be rocked toward the right hand end of the machine, reference being had to Figs. 1 and 2, which in turn moves the sliding head 20 together with the different parts carried thereby and movable therewith toward the chuck 17. For the purpose of steadying the sliding head 20 it is provided with the hollow flanged extensions 30, which extensions are mounted upon the guide rods 19.

It will be understood that the lever 28 should be pivoted intermediate its ends, and to provide for this pivotal connection the arm or bar 31 is provided, which arm or bar is preferably attached to one of the members of the head 5. It is quite well understood that a drill bit should be partially withdrawn from time to time during the time of its forward or working action for the purpose of clearing or removing the chips cut by the drill or bit and in order to provide for this partial backward movement from time to time the cam 27 is provided with two or more recesses 32 by means of which the drill bit is allowed to move back a short distance and is then again moved forward.

For the purpose of moving the drill bit backward either partially or fully so as to entirely disengage said bit from the blank or block, the spring 33 is provided, which spring is connected to the sliding head 20 by means of the hooked bar 34 or its equivalent. This spring 33 is so constructed that it will normally have what might be termed a backward pull so that after the drill or bit has been moved forward and its work completed the tension of said spring 33 will act to withdraw the drill or bit.

Upon the frame 1 are securely attached the standards 35, to the top or upper ends of which standards is connected the cross bar 36, to which cross bar are connected the guide bars 37 and the blank delivery bars 38, said bars being held in proper spaced relationship, by means of the adjustable brackets 39 and 40, which adjustable brackets are connected to the tie bars 41 and 42 and are held in fixed adjustment by means of set screws 43 located through the elongated slots 44. To the tie bar 42 is connected the downward extending arm 45 which arm is provided with the curved slot 46. To this downward extending arm 45 is connected the cam bar 47 which cam bar is extended upward and pivotally connected to the bar 36 carried by the standards 35. The cam bar 47 is extended downward a sufficient distance to engage or come in contact with the cam 48, which cam is mounted upon the power shaft 2. It will be understood that as the cam 48 revolves, a rocking movement will be imparted to the guide bars 37 and the delivery bars 38. Upon the guide bars and delivery bars are located a series of blanks designed to be bored and when the bars 37 and 38 are brought into the proper inclination, the blanks will move down and a blank will fall into the recesses 49 formed in the delivery bars 38, which recesses are so located with reference to the socket 7 and the chuck 17 that when the socket 7 is moved toward the chuck 17 the ends of the blank will be gripped and held in proper position to be acted upon by the drill or bit 26.

It will be understood that the cam 48 should be so formed and the parts operated by said cam so timed that the blank will be held stationary at the instant the socket bar together with the socket 7 is moved to grip the bar or blank. In actual use it is preferable to form the blanks round before being placed upon the guide bars 37 and the delivery bars 38 so that a rolling movement of the blanks will take place, or in other words they will roll down and be delivered one at a time into the recesses 49.

For the purpose of holding back or preventing more than one blank to be delivered at a time, the stops 50 are provided, which stops are connected to the cross bar 36 or its equivalent and do not follow the rocking movement of the bars 37 and 38 but are so located that a blank will first be stopped just back of the recesses 51 and when the bars 37 and 38 are lifted by the cam bar 47 and the cam 48 the stops 49 will be a trifle lower than the tops of the guide bars thereby allowing a blank to fall into the recesses 51 and as the bars 37 and 38 are lowered the bar or blank dropped into the recesses 51 will roll out and into the recesses 49, but all blanks above will be held against downward movement by the recesses 51 until they are lifted slightly above said recesses, which lifting movement is intermittent and so timed that but a single blank is delivered at one time. It will be understood that in order to provide for different adjustments for different sized blanks it is necessary to change the position of the cam bar 47 and in order to provide for this adjustment the downward extending arm 45 is provided with the segmental slot 46 through which slot the clamping bolt or its equivalent 52 is passed and when the cam bar 47 has been properly adjusted the clamping bolt 52 is tightened, thereby rigidly connecting the cam bar 47 to the bar 45, which bar is properly connected to the tie bar 42. It will be understood that the various cams mounted upon the shaft 2 should be so timed that as the shaft is rotated the proper timed rocking movement will be imparted to the guide bars 37 and the delivery bars 38 and the cam 8 should also be so timed that the socket bar 6, together with the socket 7 will be automatically moved to clamp and release the blank and the cam 27 should be so timed that the drill or bit will also be brought into action at the proper time, all the various parts working intermittently and in proper timed relationship with reference to each other. For the purpose of delivering the finished article a delivery spout such as 53 should be provided.

Having fully described my invention what I claim as new and desire to secure by Letters Patent, is—

1. In a device of the kind described, a blank feeding mechanism including a support, ways carried by said support and provided at their lower ends with blank receiving notches, oscillating fingers arranged to lift blanks from said notches, and an operating mechanism arranged to periodically oscillate said fingers.

2. In a device of the kind described, a blank feeding mechanism including a support, ways carried by said support and provided at their lower ends with blank receiving notches, a shaft journaled in said ways, fingers mounted on said shaft and arranged to lift the blank from said notches, a lever fixed to said shaft to rock the same and move the fingers into and out of engagement with a blank held in said notches, and cam means arranged to control the operation of the lever.

In testimony that I claim the above, I have hereunto subscribed my name in the presence of two witnesses.

JAMES R. BINNS.

Witnesses:
JOHN H. BISHOP,
F. W. BOND.